March 5, 1963 — I. GORDON — 3,079,639

METHOD AND APPARATUS FOR PREPARING MAGNETIC CORES

Filed Nov. 30, 1960 — 3 Sheets-Sheet 1

INVENTOR.
IRWIN GORDON
BY W.S. Hill
AGENT

INVENTOR.
IRWIN GORDON
BY W. S. Hill
AGENT

METHOD AND APPARATUS FOR PREPARING MAGNETIC CORES

Filed Nov. 30, 1960 3 Sheets-Sheet 3

INVENTOR.
IRWIN GORDON
BY W.S. Hill
AGENT 3,079,639

METHOD AND APPARATUS FOR PREPARING MAGNETIC CORES

Irwin Gordon, Princeton, N.J., assignor to Radio Corporation of America, a corporation of Delaware Filed Nov. 30, 1960, Ser. No. 72,748
4 Claims. (Cl. 18—47.5)

Figures 1, 2:
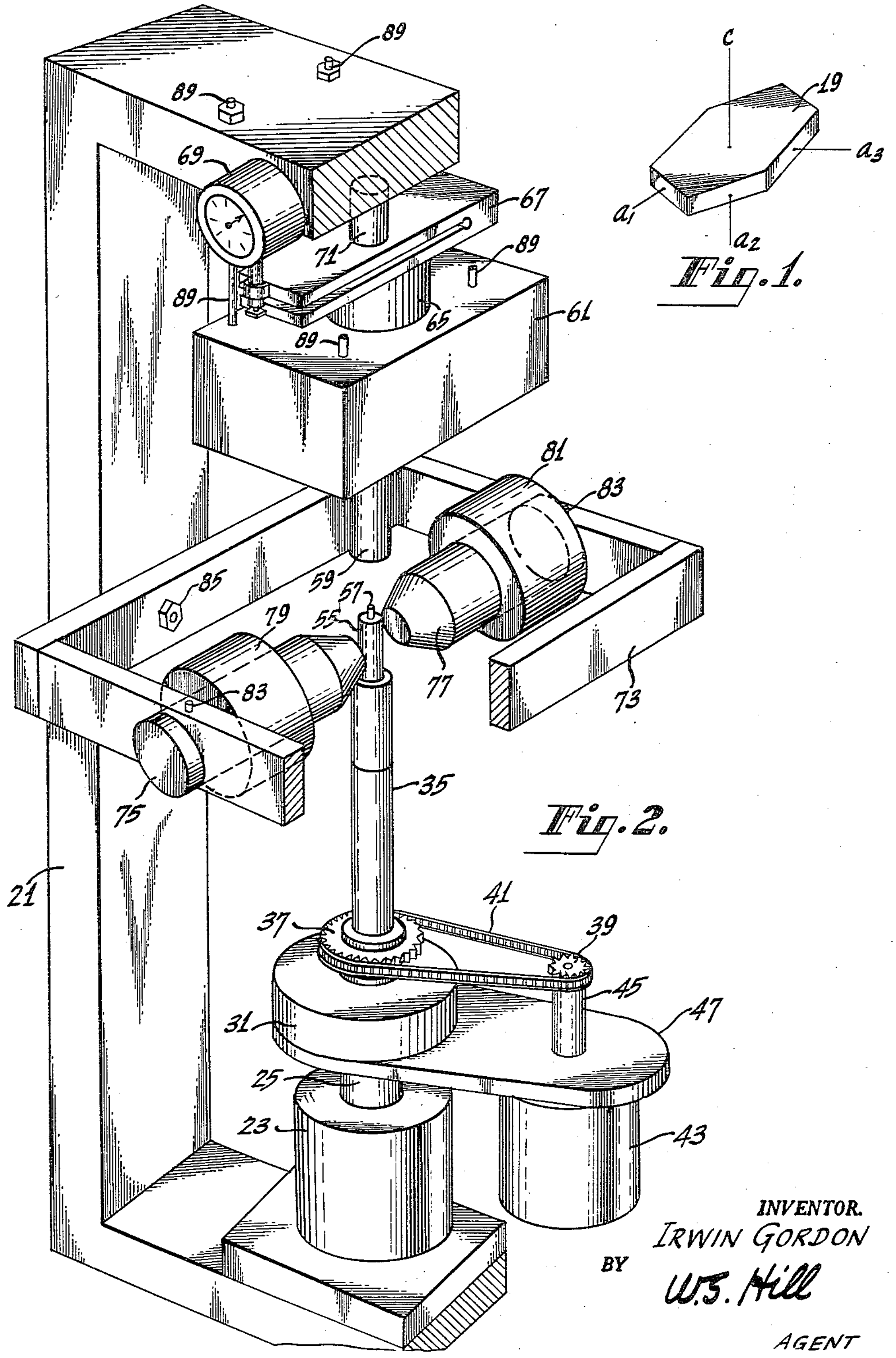

This invention relates to improved methods and to improved apparatus for preparing magnetic cores, and particularly to methods and apparatus for preparing ceramic magnetic cores of sintered particles.

Ceramic magnetic cores of sintered particles have been known previously. Such cores are generally prepared by providing a mixture of particles having the desired metallic oxide composition, pressing a quantity of the mixture to a shaped body, and then heating the shaped body to sinter the particles thereof to a unitary structure or core. In Philips Technical Review, 18, 145–154 (1956) there is described a class of ceramic magnetic cores of sintered particles having a hexagonal crystal structure and a plane of easy magnetization, which plane is perpendicular to the crystallographic "c" axis of the crystals. This class of cores exhibits a useful magnetic permeability at frequencies up to 1,000 megacycles and higher. In Philips Technical Review 19, 209–217 (1958) it is explained that the particles of these cores may be aligned or oriented prior to and during the pressing step so that the crystallographic "c" axes (which is also the direction of hard magnetization) of the particles, are substantially parallel. This is achieved by subjecting the particles alternately to two magnetic fields whose lines of force are at right angles to each other. Alternatively, one may subject the particles to a rotating magnetic field produced by mechanically rotating a yoke magnet in a plane, or with stationary magnets with the aid of three phases of the electric mains.

The aforementioned methods of orientation produce a substantial improvement in the properties of these cores, particularly in increasing the permeability of the cores. Further improvements in the orientation process are provided by the invention described herein through modified orientation methods, which permit more rapid and more efficient orientation and with improved apparatus which is cheaper and more easily and more safely operated than previous apparatus.

An object of this invention is to provide novel methods and apparatus for preparing magnetic cores.

A further object is to provide novel, and improved methods and apparatus for orienting particles during the preparation of cores thereof.

Another object is to provide novel methods and apparatus for orienting a quantity of magnetic particles having a plane of easy magnetization and then pressing the quantity of oriented particles during the preparation of magnetic cores thereof.

In general, the methods of the invention comprise first providing magnetic particles having a plane of easy magnetization. A quantity of these particles, preferably in the form of a slurry, is placed in a non-magnetic mold having an axis of rotation which passes through said quantity of particles, and the mold is rotated around the axis. At the same time, a substantially unidirectional magnetic field is applied through said quantity of particles in a direction substantially perpendicular to the axis of rotation, and the quantity of particles in the mold is compressed to a desired shaped body. Then, the shaped body is removed from the mold and sintered to a unitary structure.

By rotating the mold about its axis of rotation and simultaneously applying a stationary unidirectional magnetic field through the quantity of particles and perpendicular to the axis of rotation, the particles are oriented so that the plane of easy magnetization of each particle lies perpendicular to the axis of rotation of the mold and the axis of hard magnetization of each particle lies parallel to the axis of rotation of the mold. The use of a stationary magnetic field in combination with a rotatable mold permits markedly higher magnetic field strengths to be applied as well as a substantial reduction in electric current used to produce these fields. In addition, the apparatus provides easier access for filling and unloading the mold than previous apparatus.

The apparatus of the invention comprises a non-magnetic mold adapted to hold a quantity of particles and having an axis of rotation which passes through said quantity of particles, means for rotating said mold around said axis of rotation, means for applying a stationary magnetic field through said quantity of particles in a direction substantially perpendicular to said axis of rotation and means for compressing a quantity of particles in said mold.

Figure 3:
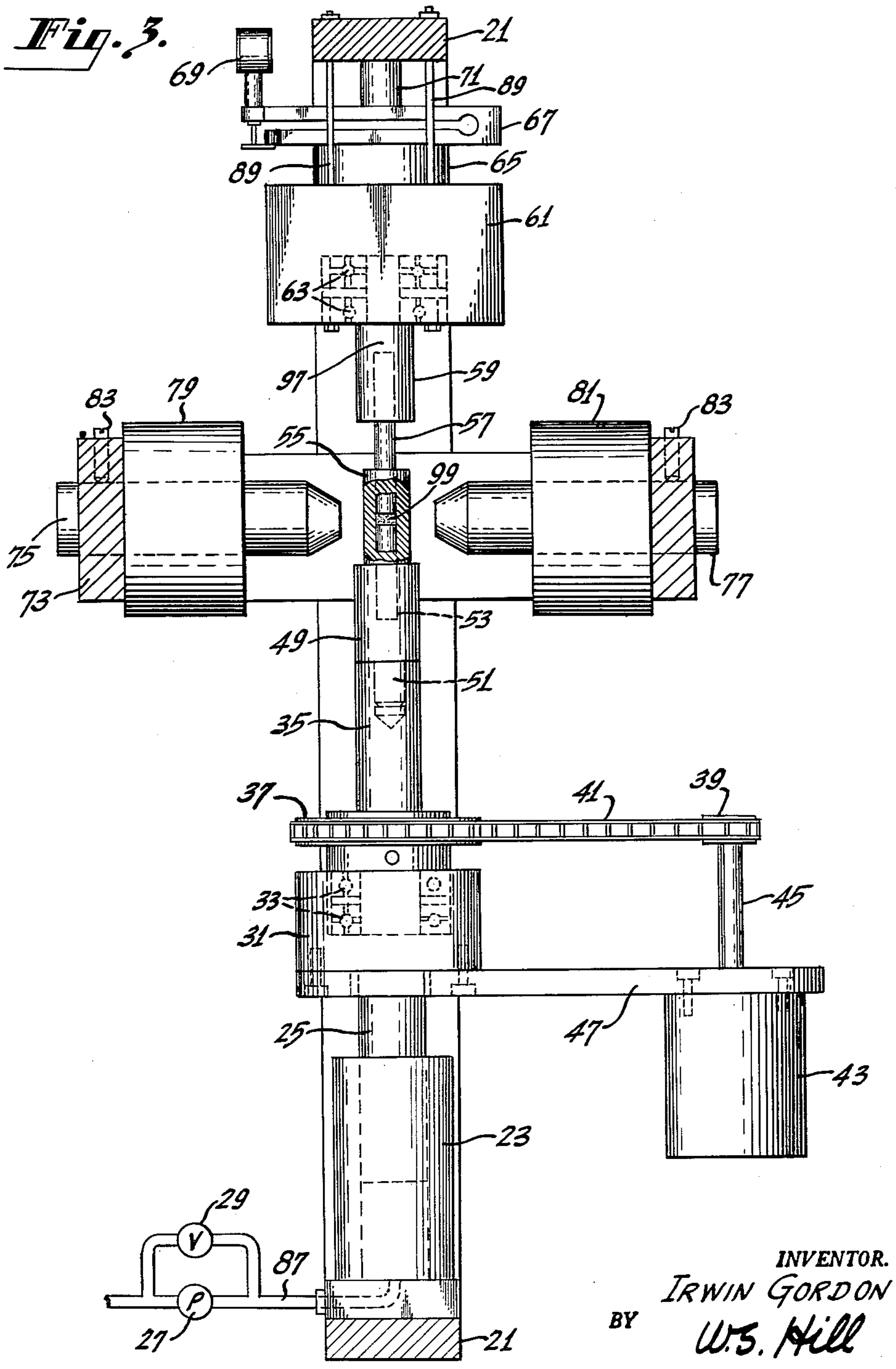
Figure 4:
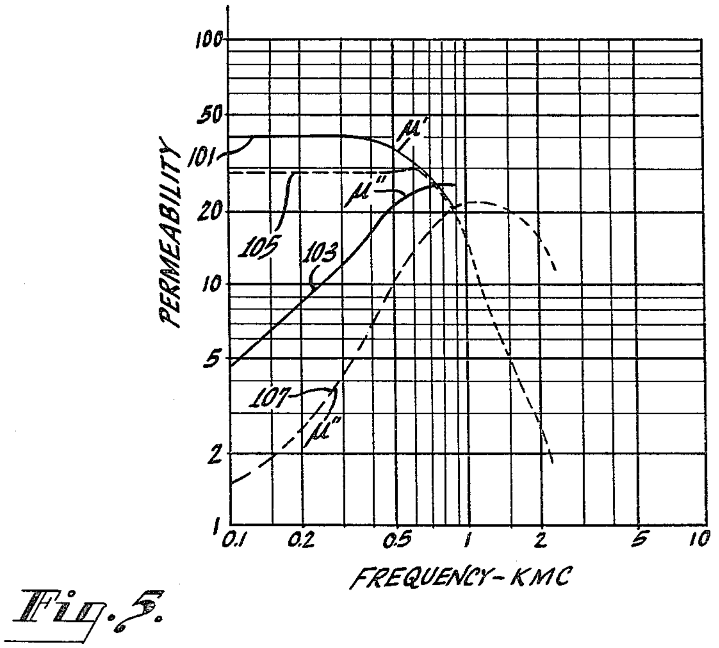
Figure 5:
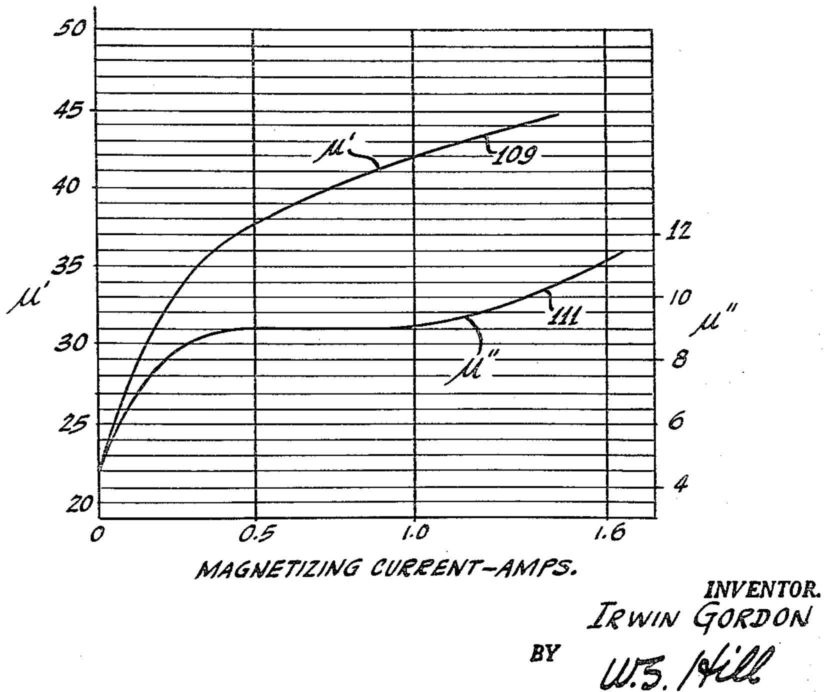

The invention is described in more detail in the following specification and in the drawings in which:

FIGURE 1 is a perspective view of a geometric shape illustrating an idealized particle to which the invention applies, FIGURE 2 is a partially broken away, perspective view of an apparatus according to the invention, FIGURE 3 is a partially sectional, partially schematic, partially broken away, elevational view of the apparatus of FIGURE 2, FIGURE 4 is a graph illustrating the relationship between the real ($\mu'$) and imaginary ($\mu''$) components of permeability with respect to the frequency of the applied field of a core prepared according to the invention, and FIGURE 5 is a graph showing qualitatively the relationship between permeability and magnetizing current used to prepare a typical core according to the invention.

The method and apparatus of the invention applies to magnetically anisotropic particles which exhibit a plane of easy magnetization. FIGURE 1 illustrates an idealized crystal 19 which may be oriented according to the invention. The crystal 19 is in the hexagonal class with a "c" crystal axis perpendicular to each of three crystal axes "$a_1$," "$a_2$," and "$a_3$" which lie about 120° apart from each other in a common plane. The crystal 19 is magnetically anisotropic in that it is more easily magnetized in any direction parallel to the plane of the "a" axes than in the direction parallel to the "c" axis. The plane of the "a" axes is referred to herein as the plane of easy magnetization.

The invention applies to all magnetic particles which exhibit a plane of easy magnetization in which magnetization is easier than in any direction intersecting this plane. The plane of easy magnetization may coincide with a crystal plane as in the crystal of FIGURE 1 or it may not so coincide. Further, the particle may crystallize in any crystal class. Since there is a plane of easy magnetization, the crystal 19 will not be completely oriented by a magnetic field which is applied in a single direction. It is required that the orienting field be applied alternately in different directions in the same plane. Particles having one of the following molar compositions may be oriented by the method of the invention $$2BaO.2MeO.6Fe_2O_3$$

(commonly referred to as $Me_2Y$)

$$BaO.2MeO.8Fe_2O_3$$

(commonly referred to as $Me_2W$), and $$3BaO.2MeO.12Fe_2O_3$$

(commonly referred to as $Me_2Z$), wherein Me is one or more bivalent metal ions selected from the group consisting of Mn, Fe, Co, Cu, Ni and Zn. See Philips Technical Review, op. cit. In $Me_2W$ and $Me_2Z$, there must be sufficient Co present to produce particles having a plane of easy magnetization.

According to the invention, a quantity of particles of the type described with respect to FIGURE 1 may be oriented and pressed into a disc-shaped body in the apparatus illustrated in FIGURES 2 and 3. The apparatus comprises a vertical rectangular frame 21 upon which the parts of the apparatus are mounted along a central axis 97. A hydraulic jack 23 is mounted with its base adjacent the bottom horizontal leg of the frame 21. The jack 23 includes a piston 25 which extends upwardly and bears on a lower bearing housing 31. The piston 25 may be driven upwardly by a fluid, preferably a hydraulic oil made for this purpose, which is pumped by a pump 27 (FIG. 3), which may be hand or motor driven, through tubing 87. The piston 25 may be returned to its lowered position by opening a valve 29 which permits the hydraulic oil to by-pass the pump 27 and return to a sump (not shown).

The lower bearing housing 31 holds a lower bearing assembly 33 (FIG. 3) which in turn holds one end of the lower shaft 35. The lower shaft is rotated by a motor 43 through a motor shaft 45, a drive gear 39, a chain 41 and a driven gear 37. The motor 43 is bolted to a motor support 47, which itself is bolted to the lower bearing housing 31. Thus, when the piston 25 moves the bearing housing 31, the shaft 35, motor 43 and drive assembly move with it. The lower bearing 33 is designed to withstand axial thrust as well as to maintain the lower shaft in position along the central axis 97.

A lower shaft adapter 49 is attached to the upper end of the lower shaft 35 by a threaded pin 51 extending from the adapter 49 which pin 51 screws into a threaded recess in the lower shaft 35. The lower shaft adapter 49 has, at its upper end, a circular hole adapted to receive a lower mold pin 53 in a sliding fit. An upper mold pin 57 is in a position along the central axis 97 opposed to the lower mold pin 53. A mold sleeve 55 rests on the lower shaft adapter 49 and extends around the upper and lower mold pins 57 and 53 forming a chamber for holding a quantity of particles 99 to be oriented and pressed. The upper and lower mold pins 57 and 53 and the mold sleeve 55 are made of a non-magnetic material, such as copper, brass or stainless steel. The upper end of the upper mold pin 57 resides in a recess in an upper shaft 59 which in turn resides in an upper thrust bearing 63 designed to withstand axial thrust and to maintain free rotation of the upper shaft 59 along the central axis 97. The upper thrust bearing 63 is supported in an upper bearing housing 61.

The upper bearing housing 61 is supported by the upper arm of the frame 21 through bolts 89 in each corner thereof. Between the frame 21 and the upper bearing housing 61 are lower and upper spacers 65 and 71 respectively, and a fork 67. A gauge 69 is linked to the tines of the fork 67 to indicate the applied pressure by the movement of the tines with respect to one another. By using the fork 67 and gauge 69 arrangement, the measurement of applied pressure is substantially independent of the weight of the assembly below. A rectangular yoke 73 of a magnetic material, such as soft iron, is mounted on the vertical legs of the frame 21 with bolts 85 (FIG. 2). A left and a right armature 75 and 77, respectively, are held in holes in opposed sides of the yoke 73 with set screws 83. The left and right armatures 75 and 77 are preferably positioned so that there is a minimum gap between the inside faces thereof, which is dependent upon the size of the mold sleeve 55. Other spacings may be made, as to suit convenience and field strength. A left coil 79 is mounted around the left armature 75 and a right coil 81 is mounted around the right armature 77. The left and right coils 79 and 81 have substantially identical characteristics comprising essentially 2,000 turns of No. 14 copper wire. The left and right coils 79 and 81 are connected in parallel so that when they are energized they induce additive magnetic fields in left and right armatures 75 and 77. The magnetic circuit may be through left armature 75, across the gap then through the right armature 77 then returned to the left armature 75 through the magnet yoke 73. Or, the magnetic circuit may be the reverse of this. The quantity of particles 99 is positioned so that it is in the gap between the left and right armatures 75 and 77. Thus, the yoke 73 and the armatures 75 and 77 provide a closed low reluctance path to the gap.

The same apparatus as described above may be used to prepare articles having a toroidal shape simply by modifying the design of the upper and lower mold pins 57 and 53. For example, the lower mold pin 53 may have a cylindrical boss (corresponding to the inside diameter of the toroid) extending upwardly into a depression in the upper mold pin 57 adapted to receive it. Other mold designs may be used.

In the preferred mode of operation, a quantity of particles is prepared as a slurry having the consistency of very heavy cream. Although not preferred, the process of the invention may be carried out with a quantity of dry particles. In the preferred mode of operation, the particles are mixed with a liquid which is substantially non-reactive with the particles and which is preferably of low viscosity. Some such liquids are carbon tetrachloride, glycerine, water, and toluene. The purpose of the liquid is to permit greater freedom of movement of the particles during orientation in a low viscosity medium. However, the higher the liquid content, the greater the amount of liquid which must be removed subsequently. There is an optimum proportion of liquid for each system, which proportion is determined empirically.

Where, as in the preferred mode of operation, the particles are in a slurry, the mold sleeve 55 is preferably made of a porous material (as well as non-magnetic). Porous metal parts of copper or stainless steel, such as are commonly used for shaft bearings, have been found to be satisfactory. The upper and lower mold pins 57 and 53 may be, but preferably are not, of a porous material.

The apparatus is assembled with the piston 25 in the lowered position and the upper mold pin 57 removed. A portion of the slurry is poured into the mold, the upper mold pin 57 is slipped into place and held manually while the piston 25 raises the sleeve 55 to engage upper mold pin 57 in the sleeve 55. The motor 43 is started causing the lower and upper shafts 35 and 59 with the mold parts between to rotate between the lower and upper bearings 33 and 63. The coils 79 and 81 are energized producing a stationary unidirectional magnetic field between the faces of the left and right armatures 75 and 77 through the particles 99. Since the mold parts are of non-magnetic materials, they do not alter the magnetic flux path between the armature faces. As the mold parts rotate in the magnetic field, the particles in the mold are oriented with the plane of easy magnetization perpendicular to the central axis 97 and with the direction of hard magnetization (the abhorred direction) parallel to the central axis 97. Pressure is now applied to the particles 99 by further raising the piston 25 by pumping oil into cylinder 23 with the pump 27 (valve 29 is closed) until the desired pressure is reached, then the pumping is stopped.

The magnetic field continues to be applied and the mold parts continue to rotate while the pressure is applied. Magnetic field strengths between about 2,000 and 15,000 oersteds and pressures in the range between about 500 and 1500 pounds per square inch (p.s.i.) have been found satisfactory. While the pressure is being applied, the fluid in the slurry passes through the porous mold sleeve 55. After a short period (estimated to be less than about a minute), the magnetic field is removed by de-energizing the coils 79 and 81, the rotation is stopped by stopping the motor 43 and the pressure is removed by opening the valve 29. The mold is disassembled and the coherent body of unsintered, pressed particles is removed.

*Example*

One example of the operation of the described invention consists of the following: 23.65 g. of $BaCO_3$, 6.64 g. of $Co_2O_3$ and 76.6 g. of $Fe_2O_3$ were mixed in a steel ball mill with isopropyl alcohol for 2 hours. This corresponds to the molar composition $3BaO.2CoO.12Fe_2O_3$, or $Co_2Z$. The mixture was dried, screened, and pressed into discs about 1" in diameter and ⅜" high. These discs are heated for about 2 hours at about 1,300° C., cooled and crushed to pass through a 16 mesh sieve. The crushed particles are then ground for about 30 hours with isopropyl alcohol in a steel ball mill. The ground particles are then dried and to the dried powder is added 3% by weight of shaved paraffin which functions as a temporary binder for the particles after pressing. A solvent for the paraffin, such as methyl chloroform, is added in the proportion of about 70 cc./100 g. of powder. This mixture is stirred to disperse the paraffin and to produce a smooth textured slurry.

A portion of this slurry is placed in the non-magnetic mold assembly of FIGURES 2 and 3 which has a porous bronze sleeve (such as an Oilite sleeve bearing) having an inside diameter of about ⅝ inch. By means of the jack shown in FIGURE 3, the mold assembly is brought into the gap between the armatures 75 and 77. The mold rotation is started and the coils are energized with about 1.6 amperes of current. Rotation is at about 100 r.p.m. A magnetic field strength of about 7,900 oersteds is applied; after a brief interval, a force of about 250 lbs. corresponding to a pressure of about 1100 p.s.i. is applied to the rotating mold assembly. The previously introduced solvent is forced through the porous mold wall, the particles thereby becoming a compact body. The magnetic field is then reduced to zero. The rotation is halted and the force removed. The thickness of the core is determined by the amount of slurry placed in the mold sleeve 55. In this example, sufficient slurry has been placed in the mold to produce a body about ⅛ inch thick after pressing and before sintering. The oriented compacted body is then removed from the mold and sintered to a coherent ceramic core at about 2385° F. (1308° C.) for about 2 hours in an oxygen atmosphere. The core is cooled to room temperature in an oxygen-containing atmosphere.

In FIGURE 4, the curve 101 shows the value of the real component of permeability ($\mu'$) with respect to applied frequency, in kilomegacycles, of the core prepared according to the Example. The value of the imaginary component of permeability ($\mu''$) with respect to applied frequency of the same article is shown by the curve 103. The curves 105 and 107 are respectively plots of the real ($\mu'$) and imaginary ($\mu''$) components of permeability of an article of the same composition but prepared by a previous process wherein the quantity of particles was stationary and the magnetic field was made to rotate during the step of orientation. The permeabilities are plotted on a logarithmic scale. First note that the value of $\mu'$ is increased by about one third up to frequencies of about 0.5 kilomegacycle using the method or orientation herein. Second, note that the value of $\mu''$, which results from using the method of the invention, rises less sharply with frequency than does the value of $\mu''$ using the previous method of orientation. As a consequence, cores prepared by the methods herein have a higher useful permeability and a higher operational frequency range than corresponding articles prepared by previous methods of orientation.

FIGURE 5 shows the relationship of the real ($\mu'$) and imaginary ($\mu''$) components of permeability at about 250 megacycles as a function of the magnetizing current used to produce the magnetic orienting field. In compiling the data for the curves of FIGURE 5, a series of articles was prepared according to the example, except that different field strengths were used in the process. The values of magnetizing current are convertible to field strengths and the following are the measured field strengths corresponding to the values of magnetizing current in FIGURE 5: 0.5 ampere produces a field of 3300 oersteds, 1.0 ampere produces a field of 6000 oersteds and 1.6 amperes produce a field of 7900 oersteds. Magnetic fields may be applied as high as 15,000 oersteds and as low as 2000 oersteds to achieve a significant improvement in the cores over cores prepared by previous processes. The preferred range of field strength is 7500 to 12,000 oersteds. Note that the value of the real component $\mu'$ rises much more rapidly than does the value of the imaginary component $\mu''$.

In addition to producing improved products, the methods and apparatus of the invention provide other advantages which result from the use of a rotatable mold in combination with stationary armatures and coils. As compared with methods wherein the armatures and coils are rotated, the methods and apparatus of the invention do away with rotating the large mass of the armature and the coil, which mass must be both statically and dynamically balanced. Thus, the apparatus is lighter and simpler in construction and easier and more efficient in its operation. Because of the lighter and simpler construction, the apparatus is less hazardous to the operator thereof, and the mold is more accessible to operator for changing and for loading. Further, this lighter and simpler construction permits achieving markedly greater field strengths than many previous apparatus.

There have been described novel and improved methods and apparatus for preparing magnetic cores. By the methods described herein, magnetic particles having a plane of easy magnetization may be oriented and pressed to produce cores which, when suitably sintered, exhibit an increased permeability and a higher useful frequency range than previous cores.

What is claimed is:

1. In a method for preparing a magnetic core, the steps comprising providing magnetic particles having a plane of easy magnetization, placing a quantity of said particles in a non-magnetic mold having an axis of rotation which passes through said quantity of particles, rotating said mold around said axis of rotation, and simultaneously applying a substantially unidirectional magnetic field through said quantity of particles in a direction substantially perpendicular to said axis of rotation.

2. The method of claim 1 wherein said magnetic field has a strength between 2,000 and 15,000 oersteds, and the speed of rotation is between 10 and 500 revolutions per minute.

3. A method for preparing a ceramic magnetic core comprising providing magnetic oxide particles having a plane of easy magnetization, mixing said particles with a liquid to produce a slurry, placing a quantity of said slurry in a porous, non-magnetic mold having an axis of rotation which passes through said quantity of slurry, rotating said mold around said axis of rotation, simultaneously applying a stationary unidirectional magnetic field through said quantity of slurry in a direction substantially perpendicular to said axis of rotation, compressing said quantity of slurry in said mold to form the particles of said slurry to a desired shaped body and to force a substantial portion of the liquid in said slurry through said mold, removing said shaped body from said mold, and then heating said shaped body to sinter the particles thereof into a unitary structure.

4. A method for preparing a magnetic core comprising providing magnetic particles having a plane of easy magnetization and a hexagonal crystal structure, pressing a quantity of said particles in a non-magnetic mold having an axis of rotation which passes through said quantity of particles, rotating said mold around said axis of rotation at about 100 revolutions per minute, simultaneously applying a stationary magnetic field having a strength between 2,000 and 15,000 oersteds through said quantity of particles in a direction substantially perpendicular to said axis of rotation; compressing said quantity of particles in said mold to a desired shaped body, and then heating said shaped body until said particles are sintered to a unitary structure.

References Cited in the file of this patent

UNITED STATES PATENTS

| | | |
|---|---|---|
| 1,930,788 | Buckner | Oct. 17, 1933 |
| 1,981,468 | Roseby | Nov. 20, 1934 |
| 2,346,784 | Pollack | Apr. 18, 1944 |
| 2,903,329 | Weber | Sept. 8, 1959 |
| 2,964,793 | Blume | Dec. 20, 1960 |